United States Patent
Stewart

(10) Patent No.: US 12,264,559 B2
(45) Date of Patent: Apr. 1, 2025

(54) SUBSURFACE SEQUESTRATION OF CO2 IN SUBSURFACE FORMATIONS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/483,825

(22) Filed: Oct. 10, 2023

(65) Prior Publication Data
US 2024/0035360 A1    Feb. 1, 2024

Related U.S. Application Data

(63) Continuation of application No. 17/838,739, filed on Jun. 13, 2022, now Pat. No. 11,834,933.

(51) Int. Cl.
*E21B 41/00*    (2006.01)
*C09K 8/594*    (2006.01)

(52) U.S. Cl.
CPC .......... *E21B 41/0064* (2013.01); *C09K 8/594* (2013.01)

(58) Field of Classification Search
CPC .... E21B 41/0064; E21B 43/164; E21B 43/24; E21B 43/40; E21B 43/25
See application file for complete search history.

(56) References Cited

U.S. PATENT DOCUMENTS

| 8,523,487 B2 | 9/2013 | Georgiou et al. |
| 8,527,205 B2 | 9/2013 | Legendre et al. |

(Continued)

FOREIGN PATENT DOCUMENTS

| WO | 012114102 A2 | 8/2012 |
| WO | 2012118410 A2 | 9/2012 |

OTHER PUBLICATIONS

Cameron et al., "Optimization of well placement, CO2 injection rates, and brine cycling for geological carbon sequestration", International Journal of Greenhouse Gas Control, vol. 10, pp. 100-112, 2012.

(Continued)

*Primary Examiner* — Zakiya W Bates
(74) *Attorney, Agent, or Firm* — DINSMORE & SHOHL LLP

(57) ABSTRACT

A method of subsurface sequestration of $CO_2$ in a subsurface formation, the method including: producing formation water and hydrocarbons from a first well located within the first region while concurrently injecting an aqueous $CO_2$ solution into a second well located within the second region, wherein the subsurface formation comprises a first region and a second region, the first region and the second region being fluidly connected, and the second region is at a greater depth than the first region and comprises at least one of the subsurface sequestration locations; and allowing the aqueous $CO_2$ solution to sink as a negatively buoyant fluid below the formation water and the hydrocarbons, thereby sequestering the $CO_2$ in the second region of the subsurface formation and wherein the aqueous $CO_2$ solution has a greater density than the formation water and the hydrocarbons, making the aqueous $CO_2$ solution negatively buoyant in the subsurface formation.

20 Claims, 4 Drawing Sheets

(56) References Cited

U.S. PATENT DOCUMENTS

| | | |
|---|---|---|
| 9,188,697 B2 | 11/2015 | Badri et al. |
| 9,651,708 B2 | 5/2017 | Edwards et al. |
| 10,087,720 B1 | 10/2018 | Vance |
| 11,105,186 B2 | 8/2021 | Rio et al. |
| 11,353,621 B2 | 6/2022 | Khan et al. |
| 11,795,784 B1 * | 10/2023 | Lau ................. E21B 43/164 |
| 2010/0116511 A1 * | 5/2010 | Ramakrishnan ...... E21B 43/164 |
| | | 166/400 |
| 2011/0042074 A1 | 2/2011 | Goldberg |
| 2023/0016334 A1 * | 1/2023 | Chorn ................ E21B 43/305 |

OTHER PUBLICATIONS

Haugan et al., "Sequestration of $CO_2$ in the deep ocean by shallow injection", Nature, vol. 357. pp. 318-320, May 28, 1992.

Pool et al., "Dynamics and design of systems for geological storage of dissolved $CO_2$", Advances in Water Resources, vol. 62, pp. 533-542, 2013.

Shariatipour et al., "An engineering solution for $CO_2$ injection in saline aquifers", International Journal of Greenhouse Gas Control, International Journal of Greenhouse Gas Control, vol. 53, pp. 98-105, 2016.

Sigfusson et al., "Solving the carbon-dioxide buoyancy challenge: The design and field testing of a dissolved $CO_2$ injection system", International Journal of Greenhouse Gas Control, vol. 37, pp. 213-219, 2015.

* cited by examiner

SUBSURFACE SEQUESTRATION OF CO2 IN SUBSURFACE FORMATIONS

CROSS-REFERENCE TO RELATED APPLICATIONS

This application claims the benefit of U.S. Non-Provisional application Ser. No. 17/838,739 filed Jun. 13, 2022, the entire disclosure of which is hereby incorporated herein by reference.

FIELD

Embodiments of the present disclosure generally relate to subsurface sequestration, particularly to a method of subsurface sequestration of $CO_2$ in a subsurface formation.

BACKGROUND $CO_2$ emissions into the atmosphere may contribute to adverse impacts of climate change. Methods offsetting or reducing these $CO_2$ emissions include storing or sequestering the $CO_2$ for long time periods, i.e. thousands of years or longer. $CO_2$ can be captured directly at the point of emission, or it can be drawn from the atmosphere. Once captured it can be transported for injection into suitable underground long-term sequestration sites. Carbon dioxide may be injected into the sequestration site as the pure gas, which is buoyant relative to in situ water within the sequestration site regardless of the CO2 phase in the subsurface reservoir-either gas or supercritical fluid (the phase change being depth and therefore pressure dependent). Therefore, injection of pure $CO_2$ requires a trapping mechanism suitable for positively buoyant fluid. Injection of pure $CO_2$, therefore, is restricted to locations where such a particular trap type exists and is subject to uncertainties associated with such traps, such as long-term efficacy of impervious cap rock. These restrictions present a barrier to adopting sequestration of $CO_2$.

SUMMARY

Accordingly, there is a continual need for novel methods for sequestering $CO_2$ in subsurface formations and geological basins, as well as means for maximizing the amount of $CO_2$ sequestered within the subsurface formation. Additionally, there are needs for determining the locations of subsurface formations, as well as regions within those subsurface formations, capable of holding the sequestered $CO_2$.

Described herein are methods for sequestering $CO_2$ and for identifying sequestration locations while providing the aforementioned benefits. The methods herein also provide the additional benefit of increasing the amount of $CO_2$ capable of being stored within the subsurface formations over traditional methods. Sequestration locations may be identified by choosing a subsurface formation with a known geological 'low' and a geological 'high,' such as for example a subsurface formation with a syncline-anticline structure. Subsurface formations containing hydrocarbons may also be identified and chosen, as these subsurface formations likely already contain geological traps that trapped the hydrocarbons in place. A first well for producing the hydrocarbons may be placed within the geological 'high,' such as the anticline, and a second well for injecting $CO_2$ may be placed within the geological 'low,' such as the syncline. In this configuration, the second well may sequester $CO_2$ while also providing the added benefit of increasing hydrocarbon production at the first well through pressure support.

$CO_2$ sequestration may be increased by injecting an aqueous $CO_2$ solution comprising an aqueous solution and dissolved $CO_2$. The aqueous $CO_2$ solution has a density at least greater than formation water in the subsurface formation. This may be guaranteed by using a solvent that matches the in-situ formation water chemistry and density—for instance sea water, brine or water extracted from the target reservoir. As a result, the aqueous $CO_2$ solution is negatively buoyant in the subsurface formation. This causes the aqueous $CO_2$ solution to sink in the subsurface formation, rather than rise. In traditional $CO_2$ floods, the injected $CO_2$ will oftentimes channel and rise through the subsurface formation 100 in preferential pathways towards the producing well, causing the $CO_2$ to be produced back to the surface along with the produced hydrocarbons. This phenomenon also reduces the efficiency of the $CO_2$ flood as well as the ultimate recovery of hydrocarbons. However, in contrast to traditional $CO_2$ floods, the aqueous $CO_2$ solution discussed in embodiments herein has a density greater than the formation water and the hydrocarbons, causing the $CO_2$ solution to permanently sink in the subsurface formation. Therefore, the aqueous $CO_2$ solution has the added benefit of not channeling through the subsurface formation toward the first well, increasing the amount of $CO_2$ that may be sequestered within the subsurface formation.

Additionally, because the aqueous $CO_2$ solution is denser than the formation water, the aqueous CO2 solution may continue to be sequestered behind a water flood from a third well to the first well, the third well being in between the first well and the second well. In this configuration, the aqueous CO2 solution may continue to sink and pool in the vicinity of the third well while additional hydrocarbons are produced at the first well due to the water flood from the third well.

According to one embodiment, a method of subsurface sequestration of $CO_2$ in a subsurface formation includes producing formation water and hydrocarbons from a first well while concurrently injecting an aqueous $CO_2$ solution into a second well, thereby maintaining a pressure balance within the subsurface formation, wherein the subsurface formation comprises a first region and a second region, the first region and the second region being fluidly connected, the second region is at a greater depth than the first region and comprises at least one of the subsurface sequestration locations, the subsurface formation also comprises the first well located within the first region, and the second well located within the second region, and the subsurface formation also comprises formation water and hydrocarbons naturally present in the subsurface formation; and allowing the aqueous $CO_2$ solution to sink as a negatively buoyant fluid below the formation water and the hydrocarbons, and into the one or more subsurface sequestration locations, thereby sequestering the $CO_2$ in the second region of the subsurface formation, wherein the aqueous $CO_2$ solution comprises an aqueous solution and dissolved $CO_2$, and the aqueous $CO_2$ solution has a greater density than the formation water and the hydrocarbons, making the aqueous $CO_2$ solution negatively buoyant in the subsurface formation.

According to another embodiment, a system for sequestering $CO_2$ in a subsurface formation includes a first region; a second region comprising at least one subsurface sequestration location, and wherein the second region is fluidly connected with the first region and at a greater depth than the first region; a first well located within the first region; a second well located within the second region; formation water naturally present in the subsurface formation; and hydrocarbons naturally present in the subsurface formation, wherein the first well is configured to produce the formation water and the hydrocarbons from the subsurface formation, the second well is configured to inject an aqueous $CO_2$ solution into the subsurface formation, the aqueous $CO_2$ solution comprises dissolved $CO_2$ and an aqueous solution, and the aqueous $CO_2$ solution has a greater density than the formation water and the hydrocarbons, making the aqueous $CO_2$ solution negatively buoyant in the subsurface formation.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
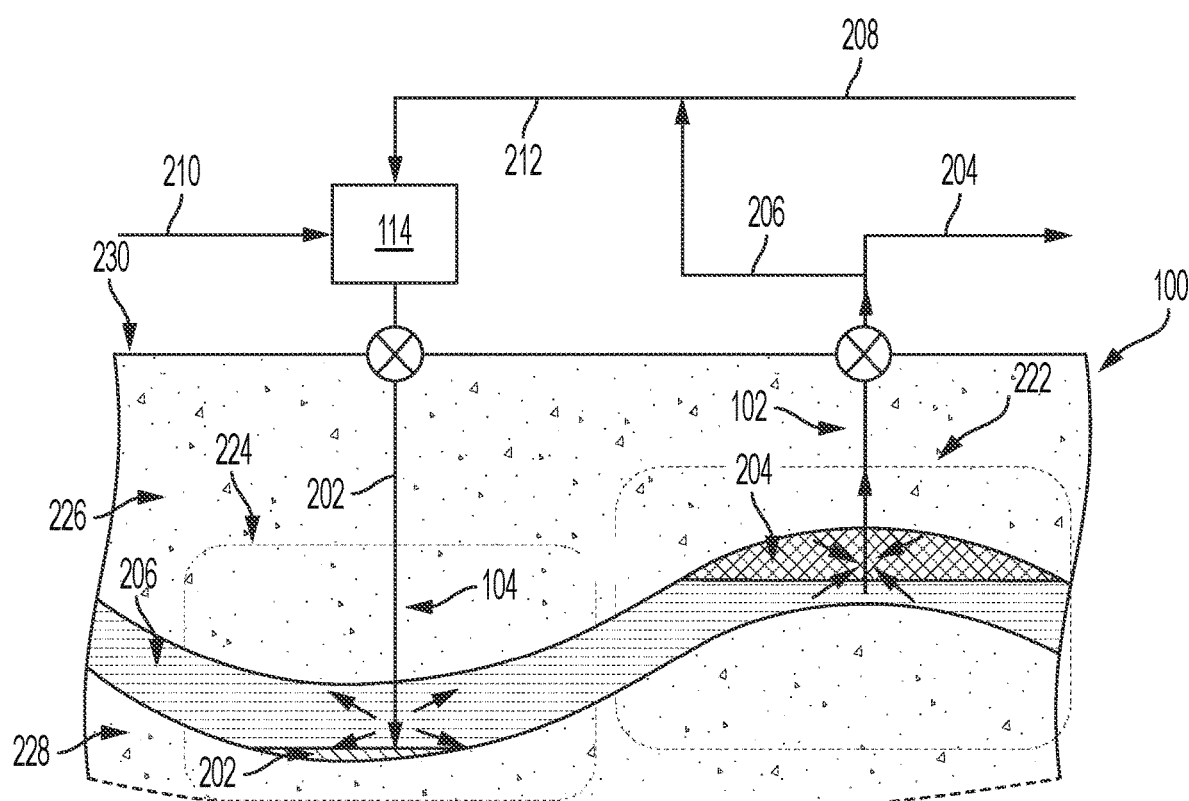
FIG. 1 is a schematic of a subsurface formation in a first stage of $CO_2$ sequestration, according to embodiments herein.

Embodiments described herein relate to methods for sequestering $CO_2$ in subsurface formations.

As used herein, "aqueous" may refer to a fluid containing, producing, resembling, or having the properties of water.

As used herein, "$CO_2$ flooding," "$CO_2$ injection," may refer to a process used to inject $CO_2$ into an oil-bearing reservoir for pressure maintenance as well as for displacing and producing incremental oil after (or sometimes before) the economic production limit has been reached. $CO_2$ flooding may also operate by reducing oil viscosity and providing miscible or partially miscible displacement of oil within the oil-bearing reservoir.

As used herein, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used herein, "waterflooding" may refer to a process used to inject water into an oil-bearing reservoir for pressure maintenance as well as for displacing and producing incremental oil after (or sometimes before) the economic production limit has been reached. This is done through the displacement of oil and free gas by water. In waterflooding, water may be injected into one or more injection wells while the oil is produced from surrounding producing wells spaced according to the desired patterns.

As used herein, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used herein, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

These and other aspects of the present methods are described in further detail below with reference to the accompanying figures, in which one or more illustrated embodiments and/or arrangements of the systems and methods are shown. In the description of the embodiments that follows, like numerals denote like components across the various figures. The systems and methods of the present application are not limited in any way to the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods.

A $CO_2$ solution injection system may be added to large-scale aquifers or reservoirs in sedimentary basins. An intrinsic property of sedimentary basins is that only a small proportion of the area of sedimentary basins (usually on the order of 10%) is occupied by structural "highs" that are valid traps for positively buoyant fluids. Therefore, the available area for traditional $CO_2$ sequestration is relatively limited. However, in embodiments, the structural "lows" between structural highs may serve as a long-term storage location for negatively buoyant fluids, such as aqueous $CO_2$ solutions 202, as discussed herein.

Referring now to FIGS. 1 to 4, a subsurface formation 100, which may include porous and permeable sedimentary material as well as non-permeable rock, may have a variety of shapes and structures. The subsurface formation 100 may include a first region 222 and a second region 224. The first region 222 and the second region 224 may be fluidly connected. The first region 222 may be at a first depth, $d_1$, and the second region 224 may be at a second depth $d_2$, wherein the second depth is greater than the first depth. In this configuration, the second region 224 may be at a greater depth than the first region 222. In embodiments, the greater depth of the second region 224 may also make the second region 224 suitable to be used as a subsurface sequestration location for fluids that are negatively buoyant in the subsurface formation 100. However, the depths of the first and second regions 222 and 224 may also be interrupted by localized structural highs and localized structural lows in the subsurface formation 100. Additionally, although the Figures and discussion imply a two-dimensional or cross-section of the subsurface formation 100 and the first and second regions 222 and 224, in practice the subsurface formation 100 will be three-dimensional, and the subsurface formation 100 has three-dimensional lesser-depth structures, such as the first region 222, that will trap positively buoyant fluids and three-dimensional greater-depth structures, such as the second region 224, that will trap negatively buoyant fluids. For example, and as shown in FIGS. 1-4, the first region 222 may be an anticline structure and the second region 224 may be a syncline structure.

As will be appreciated in the art, the first and second regions 222 and 224 may also be any combination of structures that generally create a separation of geological traps for a positively buoyant fluid and a negatively buoyant fluid in a geological unit with lateral pressure communication. The configuration shown in regions 222 and 224 will generally occur where a laterally-continuous porous unit is present. However the trapping configuration could be enhanced by local porosity developments such as reefs, local structures such as salt domes, and local seals such as unconformities.

In embodiments, the subsurface formation 100 may also include a cap rock seal 226 overlying the first region 222 and the second region 224. The cap rock seal 226 may be impermeable rock that prevents vertical migration of fluids within the subsurface formation 100 out of the subsurface formation 100 in the upwards direction. As used herein, "impermeable" means a permeability of zero or of very low permeability, such as in the range of NanoDarcys. "Darcy" as used herein, refers to the unit for permeability of a medium under Darcy's Law. The subsurface formation 100 may also include a base rock seal 228 underlying the first region 222 and the second region 224. The base rock seal 228 may also be impermeable rock, and may also prevent vertical migration of fluids within the subsurface formation 100 out of the subsurface formation 100. In this way, the cap rock seal 226 and the base rock seal 228 may trap or otherwise prevent fluids in the subsurface formation 100 from migrating out of the subsurface formation 100 to a lesser depth or a greater depth.

In embodiments, the subsurface formation 100 may also include fluids that are naturally present, i.e. in-situ, within the subsurface formation 100, such as within pores of the sedimentary material. These fluids may include formation water 206, hydrocarbons 204, or both. In this way, the subsurface formation 100 may be a hydrocarbon-containing formation. In embodiments, hydrocarbon-containing formations may be particularly suited for sequestration of $CO_2$. That is, hydrocarbon-containing formations have the probability of already containing geological traps that trapped the hydrocarbons in place, which may also be used to trap $CO_2$ after the hydrocarbons are extracted. The formation water 206 may include filtered seawater, untreated seawater, natural salt water; brackish salt water; saturated salt water; synthetic brine; mineral waters; potable water containing one or more dissolved salts, minerals, and organic materials; non-potable water containing one or more dissolved salts, minerals, and organic materials; fresh water; or combinations thereof. The hydrocarbons 204 may generally include hydrocarbon liquids as well as hydrocarbon gases, such as in one non-limiting example, crude oil and methane respectively. In embodiments, the formation water 206 is generally denser than the hydrocarbons 204. As a result, the hydrocarbons 204 may accumulate as a positively buoyant fluid in the first region 222 of the subsurface formation 100, as illustrated in FIG. 1. The relatively denser formation water 206 may then accumulate underneath the hydrocarbons 204, also as shown in FIG. 1. Further, the hydrocarbons 204 may also further be differentiated by a positively buoyant layer of hydrocarbon gases over the hydrocarbon liquids.

Still referring to FIGS. 1 to 4, the subsurface formation 100 may also include one or more subsurface wells. For example, and in embodiments, the subsurface formation 100 may include a first well 102 and a second well 104. The subsurface formation 100 may also include a third well 106, located between the first well 102 and the second well 104. The first well 102 may be located within the first region 222, and the second well 104 may be located within the second region 224. In this configuration, the third well 106 may be located within either the first region 222, the second region 224, or both. In this way, and in embodiments, the first well may be placed within the anticline, which may be the geological 'high' of the subsurface formation 100. Additionally, the second well may be placed within the syncline, which may be the geological 'low' of the subsurface formation 100. In embodiments, the first well 102, the second well 104, the third well 106, or combinations thereof may be well types such as exploratory wells, pressure observation wells, injection wells, or productions wells. The first well 102, the second well 104, the third well 106, or combinations thereof may also be any of the immediately previous well types that are subsequently converted to any other of the immediately previous well types.

In embodiments, the first well 102 may be configured to produce formation water 206 and hydrocarbons 204 from the subsurface formation 100, particularly the first region 222, as a production well. The second well 104 may be configured to inject the aqueous $CO_2$ solution 202, as discussed herein, into the subsurface formation 100, particularly into the second region 224. In this configuration, the second well 104 may be configured to inject the aqueous $CO_2$ solution 202 into the second region 224 at a depth below the first region 222. In this configuration, the second well may operate to sequester $CO_2$ into the second region 224 while at the same time providing pressure support in the subsurface formation 100 to offset pressure depletion caused by production of the hydrocarbons 204 in first well 102. This may have the added benefit then of increasing hydrocarbon production at the first well as in a traditional $CO_2$ flood.

Additionally, injecting with the aqueous $CO_2$ solution 202 in the embodiments herein may not have the downsides of traditional $CO_2$ flooding. For example, free $CO_2$ gas, as in a traditional $CO_2$ flood, will oftentimes rise and channel through the subsurface formation 100 in preferential pathways towards the producing well of the $CO_2$ flood. This channeling can reduce the efficiency of the $CO_2$ flood, as instead of sweeping hydrocarbons across the entire flood-front, a majority of the $CO_2$ flows directly through the preferential pathway to the producing well. The CO2 may then be produced back to the surface along with the hydrocarbons 204 and is therefore not sequestered. However, in the embodiments discussed herein, since $CO_2$ is dissolved in the aqueous $CO_2$ solution 202, the $CO_2$ does not break out of the aqueous $CO_2$ solution 202 in the subsurface formation 100. Since the $CO_2$ does not break out of solution, the aqueous $CO_2$ solution 202 sinks as a negatively buoyant fluid within the subsurface formation, rather than rising as a positively buoyant fluid or gas. Therefore, the aqueous $CO_2$ solution 202 does not interact with the production well and acts instead as a consistent floodfront across the subsurface formation, as illustrated in FIGS. 1-4.

In embodiments, the third well 106 may be configured to produce the formation water 206 from the subsurface formation 100, or to inject formation water 206 back into the subsurface formation 100. In this configuration, the third well 106 may inject the formation water 206 back into the subsurface formation 100 between the first well 102 and the second, and accordingly, either in the first region 222, the second region 224 or both. The third well may also act as a waterflood mechanism between the first well and second well, towards the first well. The waterflood may then provide pressure maintenance within the subsurface formation, while also enhancing hydrocarbon production at the first well 102. The second well 104 may also continue to sequester, sink, and pool the aqueous $CO_2$ solution 202 behind the third well concurrently.

In embodiments, the first well 102, the second well 104, and the third well 106 may each extend from the subsurface formation 100 to ground level 228. At the ground level 228, the first well 102, the second well 104, and the third well 106 may each be connected to surface facilities for processing fluids used in the methods herein. For example, and in embodiments, the first well 102 may be fluidly connected to a separator facility 112, the second well 104 may be fluidly connected to a $CO_2$ mixing facility 114, and the third well 106 may be fluidly connected to an allocation facility 116.

The separator facility 112 may process and separate the formation water 206 and hydrocarbons 204 that may be produced by the first well 102. The separator facility 112 may then send the formation water 206 to the $CO_2$ mixing facility 114, or, in embodiments including the third well 106, to the allocation facility 116. In embodiments including the third well 106 as an injection well, the allocation facility 116 may be configured to receive the formation water 206 from the separator facility 112, externally sourced water 208, or both and produce an aqueous solution 212 for sending to the $CO_2$ mixing facility 114. In embodiments including the third well 106 as a producing well, the allocation facility 116 may be configured to receive the formation water 206 from the third well 106, the externally sourced water 208, or both and produce the aqueous solution 212 for sending to the $CO_2$ mixing facility.

In embodiments, the externally sourced water 208 includes water with a density greater than or equal to the density of the formation water 206. The externally sourced water 208 may also include water selected from the group consisting of the formation water 206, filtered seawater, untreated seawater, natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof. In embodiments and as previously discussed, the aqueous solution 212 may include the formation water 206, the externally sourced water 208, or combinations of both. In one or more embodiments, the aqueous solution 212 may comprise at least 80 wt. %, at least 90 wt. %, at least 95 wt. %, at least 99 wt. %, or even at least 99.9 wt. % water.

In one or more embodiments, at least 90 wt. %, at least 95 wt. %, or even at least 99 wt. % of the aqueous solution 212 by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution 212 may consist of brine.

Still referring to FIGS. 1-4, and in embodiments, the $CO_2$ mixing facility 114 may dissolve a $CO_2$ stream 210 into the aqueous solution 212 to produce the aqueous $CO_2$ solution 202. In other words, the aqueous $CO_2$ solution 202 may include dissolved $CO_2$ 210 and the aqueous solution 212. The aqueous $CO_2$ solution 202 may then be injected into the second well 104 and thereby the second region 224 of the subsurface formation 100. In embodiments, not including the third well 106, the $CO_2$ mixing facility 114 may additionally be configured to receive the externally sourced water 208, the formation water 206 from the separator facility 112, or both as the aqueous solution 212. The $CO_2$ mixing facility 114 may then be configured to dissolve the $CO_2$ stream 210 into the aqueous solution 212 to produce the aqueous $CO_2$ solution 202.

As previously discussed, the aqueous $CO_2$ solution 202 may include $CO_2$ 210 dissolved in the aqueous solution 212, of which the aqueous solution 212 includes the formation water 206, externally sourced water 208 with density greater than or equal to the formation water 206, or both. As will be understood in the art, the dissolved $CO_2$ in the aqueous $CO_2$ solution 202 also contributes to added density of the aqueous $CO_2$ solution 202. Therefore, the aqueous $CO_2$ solution 202 may have a greater density than the formation water 206 and the hydrocarbons 204. In embodiments, the greater density may make the aqueous $CO_2$ solution 202 negatively buoyant in the subsurface formation 100, particularly the formation water 206 and the hydrocarbons 204. Therefore, the aqueous $CO_2$ solution 202 will sink in the subsurface formation 100 below the formation water 206 and the hydrocarbons 204.

In embodiments, the aqueous solution 212 may have a density rising from 1 g/mL (fresh water) to 1.2 g/mL. For example, the density may be from 1 g/ml to 1.15 g/ml, from 1 g/ml to 1.1 g/ml, from 1 g/ml to 1.05 g/ml, from 1.05 g/ml to 1.2 g/ml, from 1.1 g/ml to 1.2 g/ml, or even from 1.15 g/ml to 1.2 g/ml. In embodiments, the aqueous $CO_2$ solution 202 may have a density up to 15% higher than the density of the formation water 206, such as up to 14% higher, up to 13% higher, up to 12% higher, up to 11% higher, up to 10% higher, up to 9% higher, up to 8% higher, up to 7% higher, up to 6% higher, up to 5% higher, up to 4% higher, up to 3% higher, up to 2% higher, or even up to 1% higher. As will be appreciated in the art, the density ratio will depend on the amount of $CO_2$ dissolved within the aqueous solution 212 as well as the choice of solvent (aqueous solution 212) in relation to the properties of the formation water 206.

Having described the subsurface formations illustrated in the Figures and above, embodiments disclosed herein take advantage of the features of these subsurface formations for sequestration of $CO_2$. The subsurface formations 100 in the method discussed herein may include any of the subsurface formations 100 previously or hereinafter discussed.

A method of subsurface sequestration of $CO_2$ in a subsurface formation 100, as illustrated in FIG. 1, includes identifying one or more subsurface sequestration locations in the subsurface formation 100, producing the formation water 206 and the hydrocarbons 204 from the first well 102 while concurrently injecting an aqueous $CO_2$ solution 202 into the second well 104, and allowing the aqueous $CO_2$ solution 202 to sink as a negatively buoyant fluid below the formation water 206 and hydrocarbons 204, and into the one or more subsurface sequestration locations, thereby sequestering the $CO_2$ in the second region 224 of the subsurface formation 100.

In embodiments, injecting the aqueous $CO_2$ solution 202 into the second well 104 may maintain pressure in the subsurface formation 100 by replacing the formation water 206, the hydrocarbons 204, or both produced at the first well 102, and thereby fluid pressure resulting from the previous within the subsurface formation 100. This may allow a pressure balance to be maintained with the subsurface formation 100, increasing the production of the formation water 206 and hydrocarbons 204 at the first well 102. Vice versa, the production of the formation water 206 and hydrocarbons 204 at the first well 102 may increase the amount of aqueous $CO_2$ solution 202 that may be sequestered within the subsurface formation 100. For example, the removal of formation water 206 and hydrocarbons 204 may decrease the fluid pressure of the subsurface formation 100 in both the first and second regions 222 and 224, reducing the injection pressure that may be needed to inject the aqueous $CO_2$ solution 202 into the second well 104 and subsequently the second region 224.

Figure 2:
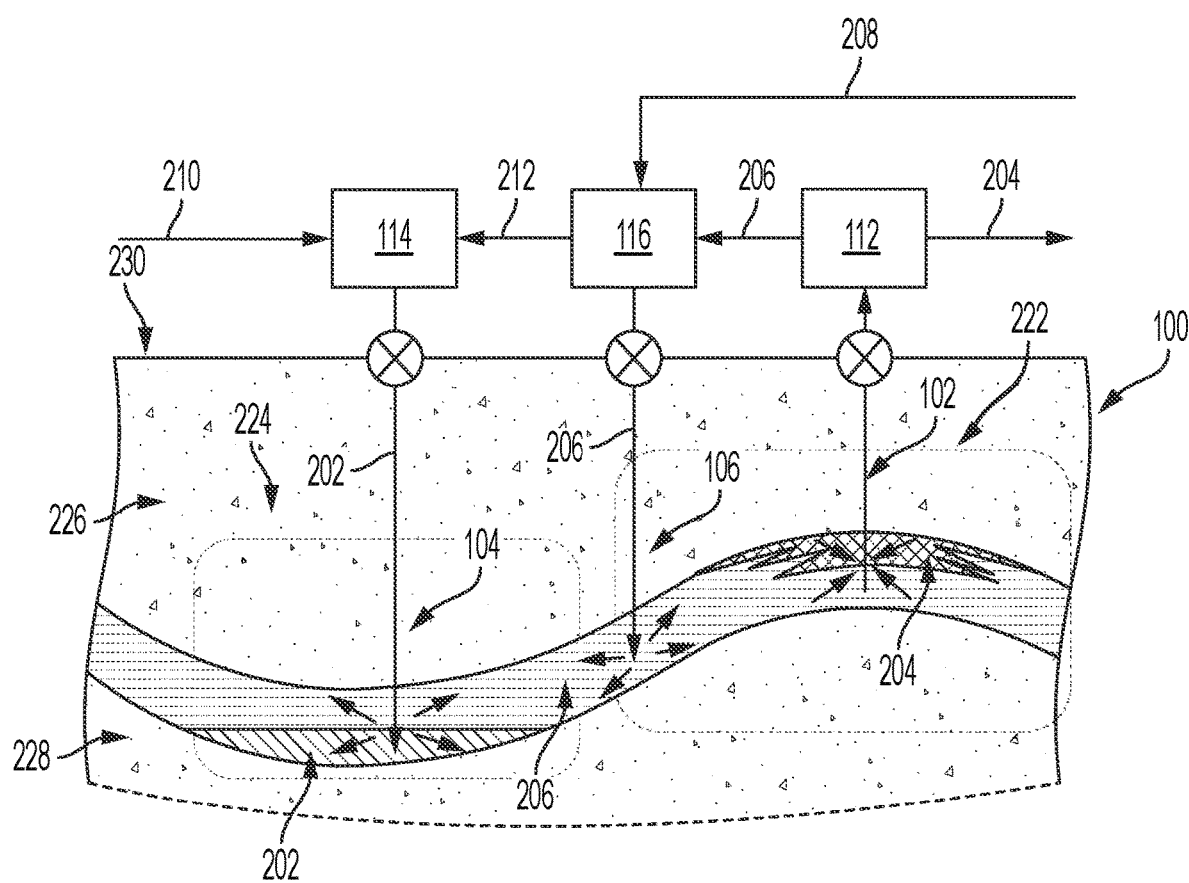
FIG. 2 is a schematic of a subsurface formation in a second stage of $CO_2$ sequestration, according to embodiments herein.

In embodiments and as illustrated in FIG. 2, the method may further include observing a decrease in a pressure of the subsurface formation 100 at the first well 102, and injecting the formation water 206 produced at the first well 102 at the third well 106. At a first stage of production at the first well 102, pressure may be maintained by only the injection of the aqueous $CO_2$ solution 202 at the second well 104. However, as formation water 206 and hydrocarbons 204 continue to be removed at the first well 102, it may be necessary to add other methods to maintain pressure within the subsurface formation 100 that are closer in proximity and in fluid communication to the first well 102, and thereby continue to produce hydrocarbons 204 at the first well 102. Accordingly, formation water 206 may be injected at the third well 106, such as in the configuration of FIG. 3, to maintain the pressure balance within the subsurface formation 100. Injecting the formation water 206 produced at the first well 102 at the third well 106 may maintain pressure in the subsurface formation 100 by replacing the formation water 206, the hydrocarbons 204, or both produced at the first well 102, and thereby fluid pressure resulting from the previous. As previously mentioned, the continued concurrent injection of the aqueous $CO_2$ solution 202 may also provide additional pressure maintenance for the hydrocarbons 204 that are produced and removed from the subsurface formation 100 at the first well 102.

Depending on the ratio of hydrocarbons 204 to formation water 206 produced at the first well 102, i.e. if the ratio is high, re-injection of the formation water 206 at the third well 106 may not be sufficient alone to maintain the pressure balance within the subsurface formation 100. In this situation, externally sourced water 208 may be required to be injected in addition to or in replacement for the re-injected formation water 206. Externally sourced water 208 may have at least the same density as the formation water 206, in order for the resulting injected fluid to not be positively buoyant in the subsurface formation 100. In a similar manner, the externally sourced water 208 may also be added to the aqueous solution 212 instead of just formation water 206 for the aqueous $CO_2$ solution.

Figure 3:
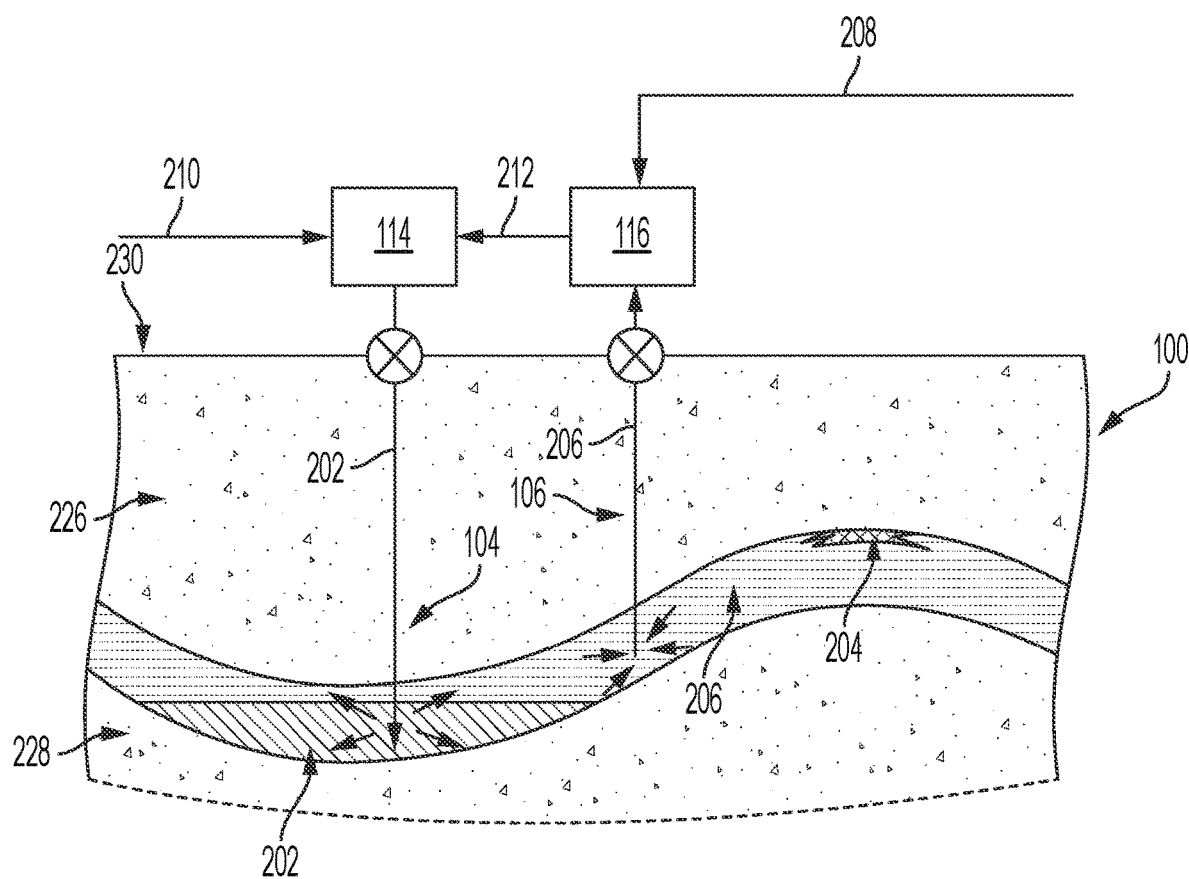
FIG. 3 is a schematic of a subsurface formation in a third stage of $CO_2$ sequestration, according to embodiments herein.
Figure 4:
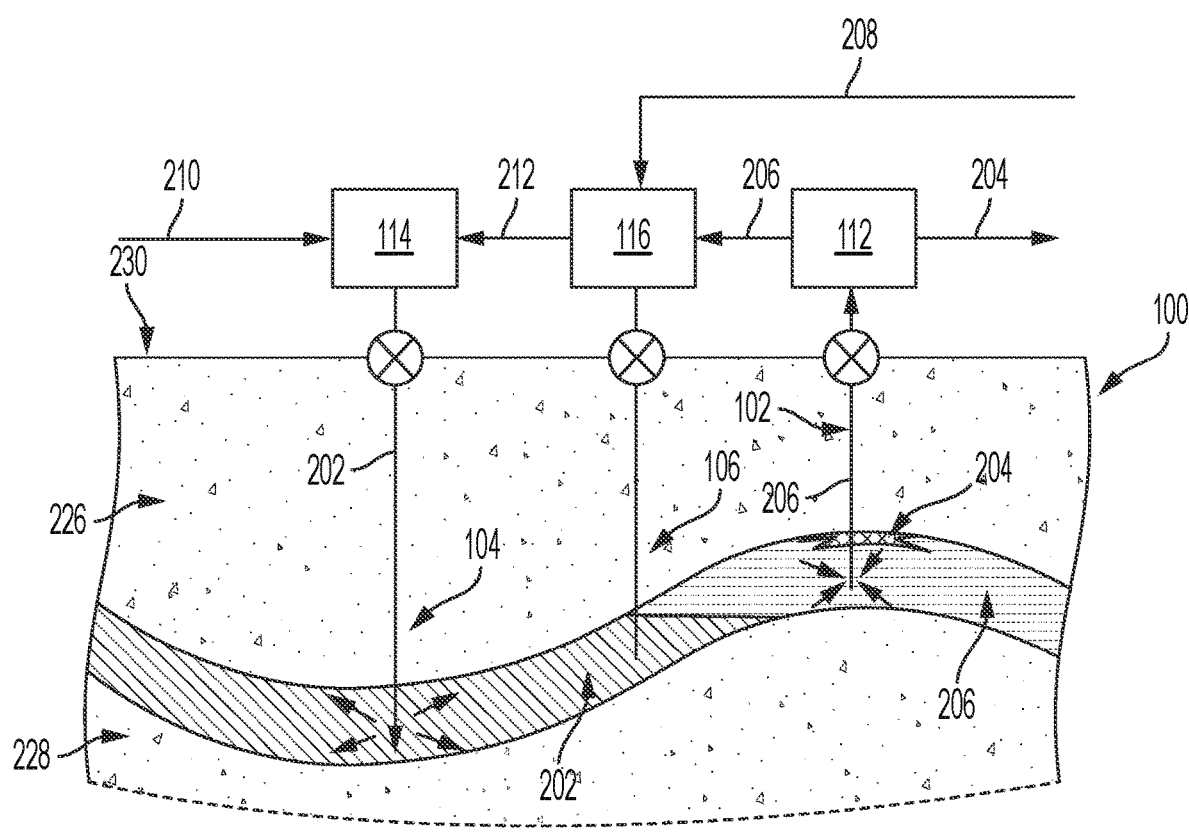
FIG. 4 is a schematic of a subsurface formation in a fourth stage of $CO_2$ sequestration, according to embodiments herein.

The method, as illustrated in FIG. 3, may then further include observing a decrease in hydrocarbon production at the first well 102, stopping production of the formation water 206 and the hydrocarbons 204 at the first well 102, and producing the formation water 206 at the third well 106. The "decrease in hydrocarbon production," as used herein, may be the threshold of hydrocarbon production below which it is no longer economically feasible to produce the hydrocarbons 204 and formation water 206. Accordingly, at this stage of the method, production at the first well 102 may be stopped and the method translated entirely to maximization of $CO_2$ sequestration within the subsurface formation 100. In these embodiments, the third well 106 acts as the method of reducing fluid pressure within the subsurface formation 100 by producing the re-injected formation water 206. As previously mentioned, the reduction of fluid pressure within the subsurface formation 100 may increase the amount of aqueous $CO_2$ solution 202 that may be sequestered within the subsurface formation 100. In other embodiments, the first well 102 may also be repurposed as a formation water producing well, similar to the third well 106. This may act as an additional method to reduce fluid pressure within the subsurface formation 100, allowing greater amounts and rates of injection of the aqueous $CO_2$ solution.

This process may then continue until aqueous $CO_2$ solution 202 is observed to be produced at the third well 106. The production of the aqueous $CO_2$ solution at the third well 106 may indicate the filling of the second region 224 with the aqueous $CO_2$ solution to the extent the aqueous $CO_2$ solution 202 has reached the third well 106. This is illustrated for example in FIG. 4. The method may then include observing aqueous $CO_2$ solution 202 production at the third well 106, stopping production of the formation water 206 at the third well 106, and producing the formation water 206 at the first well 102 until either: the aqueous $CO_2$ solution 202 is observed to be produced at the third well 106, or the aqueous $CO_2$ solution 202 is unable to be injected at the second well 104 due to pressure constraints. However, if the second well 104 is spaced a great distance away from the first well 102 and the third well 106, production of the aqueous $CO_2$ solution 202 may never be observed at the first well 102 or the third well 106. In this case, economics or pressure constraints of the subsurface formation 100 and the third well 106's wellbore casing may be the limitations that prevent further sequestration of $CO_2$. This may also be the case in embodiments where the subsurface formation does not include the base rock seal 228, as the aqueous $CO_2$ solution may continue to sink into the depths of the subsurface formation and not fill the second region 224 such that the aqueous $CO_2$ solution will be observed at the first well 102 or the third well 106.

Similar to the third well 106, the production of the aqueous $CO_2$ solution 202 at the first well 102 may indicate the filling of both the first and second regions 222 and 224 with the aqueous $CO_2$ solution 202. This may also indicate a maximization of the amount of $CO_2$ that may be sequestered within the subsurface formation 100 due to the volume of the subsurface formation. Similarly, in embodiments, pressure within the subsurface formation 100 may continue to rise as more and more of the aqueous $CO_2$ solution 202 is injected. It is contemplated that the injection may reach a limit at which the pressure required to inject further aqueous $CO_2$ solution 202 may be too high to be practically feasible. Stated another way, the needed injection pressure may become so high that it may pose a risk to the integrity of a wellbore casing within the third well, and which prevents further sequestration of $CO_2$. This may also indicate a maximization of the amount of $CO_2$ that may be sequestered within the subsurface formation 100 due to pressure. However, it may also be possible to increase the rate of formation water 206 production at the first well 102 or the third well 106 to counter progressive increases in pressure observed at the second well 104. In this way, pressure may continue to be balanced within the subsurface formation 100 and economic parameters may become the limiting factor to sequester further $CO_2$ within the subsurface formation 100.

As previously discussed, methods of subsurface sequestration of $CO_2$ in a subsurface formation 100 may include identifying one or more subsurface sequestration locations in the subsurface formation 100 that are suitable for negatively buoyant fluids. Any method of subsurface mapping that may be standard in, for example, the fields of oil and gas exploration, may be used to identify structural lows and the associated sequestration locations. In embodiments, the mapping may be performed by reflection seismic mapping, which uses 2-dimensional seismic data or 3-dimensional seismic data to form a subsurface map of the area under study. Reflection seismic data mapping may be augmented (also referred to as "ground truthed") by drilled wells (also referred to as "subterranean bores") to ensure the accuracy of depth on these maps. In embodiments, maps may be constructed from well data alone when a sufficient number of such wells are drilled, such as the first, second, and third wells, into the area under study. It may also be possible to use potential field data, such as gravity data, magnetism, or both gravity data and magnetism, to identify structural lows and the associated sequestration locations. In embodiments, more than one method of identifying the subsurface sequestration locations may be used. Regardless of the methods used, highs and lows are intrinsic properties of any depth map that is produced. In embodiments, height or depth sufficiency may be determined by the volume represented by the trap, which volume is itself a product of the height or depth and area, as well as the reservoir properties.

As previously mentioned, after one or more subsurface sequestration locations are identified in the subsurface formation 100, the aqueous $CO_2$ solution 202 may be injected into the subsurface formation 100. In embodiments, the aqueous solution 212 may comprise enough $CO_2$ 210 that the density of the resulting aqueous solution 212 is up to 15% higher than the density of the aqueous solution 212 into which it has been dissolved, such as from 1% higher to 15% higher, from 2% higher to 15% higher, from 3% higher to 15% higher, from 4% higher to 15% higher, from 5% higher to 15% higher, from 6% higher to 15% higher, from 7% higher to 15% higher, from 8% higher to 15% higher, from 9% higher to 15% higher, from 10% higher to 15% higher, from 1% higher to 14% higher, from 1% higher to 13% higher, from 1% higher to 12% higher, from 1% higher to 11% higher, from 1% higher to 10% higher, from 1% higher to 9% higher, from 1% higher to 8% higher, from 1% higher to 7% higher, from 1% higher to 6% higher, or even from 1% higher to 5% higher. In embodiments, the concentration of $CO_2$ 210 in the aqueous solution 212 may be sufficiently high such that the aqueous $CO_2$ solution 202 is denser than the water naturally present in the subsurface formation 100. Dissolving additional $CO_2$ 210 in the aqueous solution 212 is expected to further increase the density of the aqueous $CO_2$ solution 202.

In embodiments, the density of the formation water 206 naturally present in the subsurface formation 100 and/or the aqueous solution 212 may be determined by obtaining a sample of the previous fluids of known volume and weighing it with an accurate measuring device, having ensured the sample has remained unaltered between the sampling and the weighing. This can be accomplished in the subsurface by extracting a sample of the formation water 206 with a downhole sampling tool, such as a Modular Formation Dynamics Tester from Schlumberger, for example. In embodiments, the density of the formation water may also be determined by taking a set of vertically-spaced pressure points and determining the fluid density from the pressure gradient.

In embodiments, previously drilled exploratory wells may be used as the second well 104 for injecting the aqueous $CO_2$ solution 202 into the subsurface formation 100. In the same or different embodiments, at least one previously drilled pressure observation well may be used as the second well 104 for injecting the aqueous $CO_2$ solution 202 into the subsurface formation 100. In the same or different embodiments, at least one previously drilled production well may be used as the second well 104 for injecting the aqueous $CO_2$ solution 202 into the subsurface formation 100.

Once injected into the subsurface formation 100, the $CO_2$ 210 in the aqueous $CO_2$ solution 202 may be retained within the subsurface formation 100 for long periods of time. That is, no measurable amount of the $CO_2$ 210 may be released from the subsurface formation 100 for at least 1 year, at least 5 years, at least 10 years, or at least 15 years. Of course, the $CO_2$ 210 may be retained with the subsurface formation for a much longer period of time, such as 100 for 100 years or more, for instance for 2000 years or more, for 3000 years or more, for 4000 years or more, or even for 5000 years or more.

The subject matter described herein has many advantages. As previously discussed, by injecting relatively dense fluids that will sink in the subsurface formation 100, particularly into lower areas of the subsurface formation 100, these low areas may serve a purpose in the hydrocarbon production cycle through restoration of pressure within the vicinity of producing hydrocarbon fields and increasing the ultimate proportion of recovered hydrocarbons 204. Moreover, injecting $CO_2$ 210 dissolved in the aqueous solution 212 as the aqueous $CO_2$ solution 202 that is negatively buoyant will not interfere with engineering activity tied to structural highs, such as ongoing oil or gas production. Stated in another way, since the $CO_2$ 210 is dissolved in the aqueous solution 212, the $CO_2$ 210 will not channel its way towards and break through to production wells. The aqueous $CO_2$ solution 202 may then pool in place and steadily rise in level, without interacting with or channeling towards the first well 102. As discussed previously, this may allow greater amounts of $CO_2$ 210 to be stored within the subsurface formation 100 than with traditional methods, where breakthrough $CO_2$ is normally observed at the producing wells before the floodfront reaches the producing well.

It is contemplated that the methods discussed herein may also be used for the sequestration of other materials for a period ranging from 1 to 5000 years or greater. It is contemplated that any material capable of being dissolved in an aqueous solution 212 and desired to be disposed of may be sequestered in the methods herein. For example, toxic chemicals, nuclear waste, combinations thereof.

In the embodiments used herein, it is contemplated that there is no significant lateral flow within the larger reservoir containing the subsurface formation 100. If significant lateral flow exists, long term sequestration (10,000 years or more) may not be possible as reservoir fluids may eventually migrate to other locations without the trapping mechanisms discussed herein.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A method of subsurface sequestration of $CO_2$ in a subsurface formation, the method comprising:
producing formation water and hydrocarbons from a first well while concurrently injecting an aqueous $CO_2$ solution into a second well, thereby maintaining a pressure balance within the subsurface formation, wherein
the subsurface formation comprises a first region and a second region, the first region and the second region being fluidly connected,
the second region is at a greater depth than the first region and comprises at least one of the subsurface sequestration locations,
the subsurface formation also comprises the first well located within the first region, and the second well located within the second region, and
the subsurface formation also comprises formation water and hydrocarbons naturally present in the subsurface formation; and
allowing the aqueous $CO_2$ solution to sink as a negatively buoyant fluid below the formation water and the hydrocarbons, and into the one or more subsurface sequestration locations, thereby sequestering the $CO_2$ in the second region of the subsurface formation, wherein the aqueous $CO_2$ solution comprises an aqueous solution and dissolved $CO_2$, and
the aqueous $CO_2$ solution has a greater density than the formation water and the hydrocarbons, making the aqueous $CO_2$ solution negatively buoyant in the subsurface formation.

2. The method of claim 1, further comprising:
observing a decrease in a pressure of the subsurface formation at the first well; and
injecting the formation water produced at the first well at a third well, thereby reinstituting the pressure balance within the subsurface formation, and wherein:
the third well is located between the first and second wells, and
the third well is located within the first region or the second region.

3. The method of claim 2, further comprising:
observing a decrease in hydrocarbon production at the first well;
stopping production of the formation water and the hydrocarbons at the first well; and
producing the formation water at the third well.

4. The method of claim 3, further comprising:
observing aqueous $CO_2$ solution production at the third well;
stopping production of the formation water at the third well; and
producing the formation water at the first well until:
the aqueous $CO_2$ solution is observed to be produced at the third well, or
the aqueous $CO_2$ solution is unable to be injected at the second well due to pressure constraints.

5. The method of claim 2, wherein the third well is an exploratory well, a pressure observation well, an injection well, a production well, or any of the immediately previous well types converted to any other of the immediately previous well types.

6. The method of claim 1, wherein the first region is an anticline and the second region is a syncline.

7. The method of claim 1, wherein the first well, the second well, or both are exploratory wells, pressure observation wells, injection wells, productions wells, or any of the immediately previous well types converted to any other of the immediately previous well types.

8. The method of claim 1, wherein the aqueous solution comprises water selected from the group consisting of the formation water, filtered seawater, untreated seawater, natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof.

9. The method of claim 1, wherein the aqueous solution comprises the formation water naturally present in the subsurface formation.

10. The method of claim 1, wherein the formation water comprises filtered seawater, untreated seawater, natural salt water; brackish salt water; saturated salt water; synthetic brine; mineral waters; potable water containing one or more dissolved salts, minerals, and organic materials; non-potable water containing one or more dissolved salts, minerals, and organic materials; fresh water; or combinations thereof.

11. The method of claim 1, wherein determining the density of the formation water comprises determining a fluid density calculated from a plurality of vertically spaced pressure measurements taken above the subsurface formation.

12. The method of claim 1, wherein:
the subsurface formation further comprises a cap rock seal overlying the first region and the second region; and
the cap rock seal prevents vertical migration of the formation water, hydrocarbons, and aqueous $CO_2$ solution out of the subsurface formation.

13. The method of claim 12, wherein:
the subsurface formation further comprises a base rock seal underlying the first region and the second region; and
the base rock seal also prevents vertical migration of the formation water, hydrocarbons, and aqueous $CO_2$ solution out of the subsurface formation.

14. The method of claim 1, wherein the subsurface formation is a sedimentary basin.

15. A system for sequestering $CO_2$ in a subsurface formation comprising:
a first region;
a second region comprising at least one subsurface sequestration location, and wherein the second region is fluidly connected with the first region and at a greater depth than the first region;
a first well located within the first region;
a second well located within the second region;
formation water naturally present in the subsurface formation; and
hydrocarbons naturally present in the subsurface formation, wherein
the first well is configured to produce the formation water and the hydrocarbons from the subsurface formation,
the second well is configured to inject an aqueous $CO_2$ solution into the subsurface formation,
the aqueous $CO_2$ solution comprises dissolved $CO_2$ and an aqueous solution, and
the aqueous $CO_2$ solution has a greater density than the formation water and the hydrocarbons, making the aqueous $CO_2$ solution negatively buoyant in the subsurface formation.

16. The system of claim 15, further comprising a third well located between the first and second wells, wherein the third well is located within the first region or the second region.

17. The system of claim 16, wherein the first well, the second well, the third well, or combinations thereof are exploratory wells, pressure observation wells, injection wells, productions wells, or any of the immediately previous well types converted to any other of the immediately previous well types.

18. The system of claim 15, wherein the first region is an anticline and the second region is a syncline.

19. The system of claim 15, wherein the aqueous solution comprises the formation water naturally present in the subsurface formation.

20. The system of claim 15, wherein:
the subsurface formation further comprises a cap rock seal overlying the first region and the second region, and the cap rock seal prevents vertical migration of the formation water, hydrocarbons, and aqueous $CO_2$ solution out of the subsurface formation;
the subsurface formation further comprises a base rock seal underlying the first region and the second region, and the base rock seal also prevents vertical migration of the formation water, hydrocarbons, and aqueous $CO_2$ solution out of the subsurface formation; or
both.

* * * * *